(12) United States Patent
Keller et al.

(10) Patent No.: US 11,253,948 B2
(45) Date of Patent: Feb. 22, 2022

(54) SONOTRODE

(71) Applicant: MS Ultraschall Technologie GmbH, Spaichingen (DE)

(72) Inventors: Fabian Keller, Tuttlingen (DE); Volker Krell, Neuhausen (DE)

(73) Assignee: MS ULTRASCHALL TECHNOLOGIE GMBH, Spaichingen (DE)

( * ) Notice: Subject to any disclaimer, the term of this patent is extended or adjusted under 35 U.S.C. 154(b) by 163 days.

(21) Appl. No.: 16/696,993

(22) Filed: Nov. 26, 2019

(65) Prior Publication Data

US 2020/0164459 A1    May 28, 2020

(30) Foreign Application Priority Data

Nov. 27, 2018    (DE) .......................... 102018129912.5

(51) Int. Cl.
| | | |
|---|---|---|
| *B32B 37/00* | (2006.01) | |
| *B23K 20/10* | (2006.01) | |
| *B06B 3/00* | (2006.01) | |
| *B29C 65/08* | (2006.01) | |

(52) U.S. Cl.
CPC .............. *B23K 20/106* (2013.01); *B06B 3/00* (2013.01); *B29C 65/082* (2013.01)

(58) Field of Classification Search
USPC ...................................................... 156/580.1
See application file for complete search history.

(56) References Cited

U.S. PATENT DOCUMENTS

| | | | |
|---|---|---|---|
| 8,610,334 B2 * | 12/2013 | Bromfield | ............. B06B 1/0611 |
| | | | 310/323.19 |
| 2009/0236938 A1 | 9/2009 | Bromfield | |
| 2010/0326586 A1 | 12/2010 | Moeglich | |
| 2011/0278988 A1 * | 11/2011 | Young | ............ A61B 17/320068 |
| | | | 310/328 |
| 2016/0302816 A1 | 10/2016 | Clayton | |
| 2018/0008303 A1 | 1/2018 | Wuchinich | |

FOREIGN PATENT DOCUMENTS

| | | |
|---|---|---|
| CH | 438810 A | 12/1967 |
| CN | 103920635 B | 7/2014 |
| CN | 108787407 A | 11/2018 |
| DE | 3500607 A1 | 5/1987 |
| DE | 4406818 C1 | 10/1995 |
| EP | 2362752 A1 | 9/2011 |
| WO | 2010049684 A1 | 5/2010 |

\* cited by examiner

*Primary Examiner* — James D Sells
(74) *Attorney, Agent, or Firm* — Dickinson Wright PLLC

(57) ABSTRACT

The invention relates to an ultrasonic oscillating unit that comprises a cylindrical base body having a center axis and a jacket surface into which a plurality of slits are introduced that extend obliquely to the center axis in a side view of the jacket surface.

14 Claims, 4 Drawing Sheets

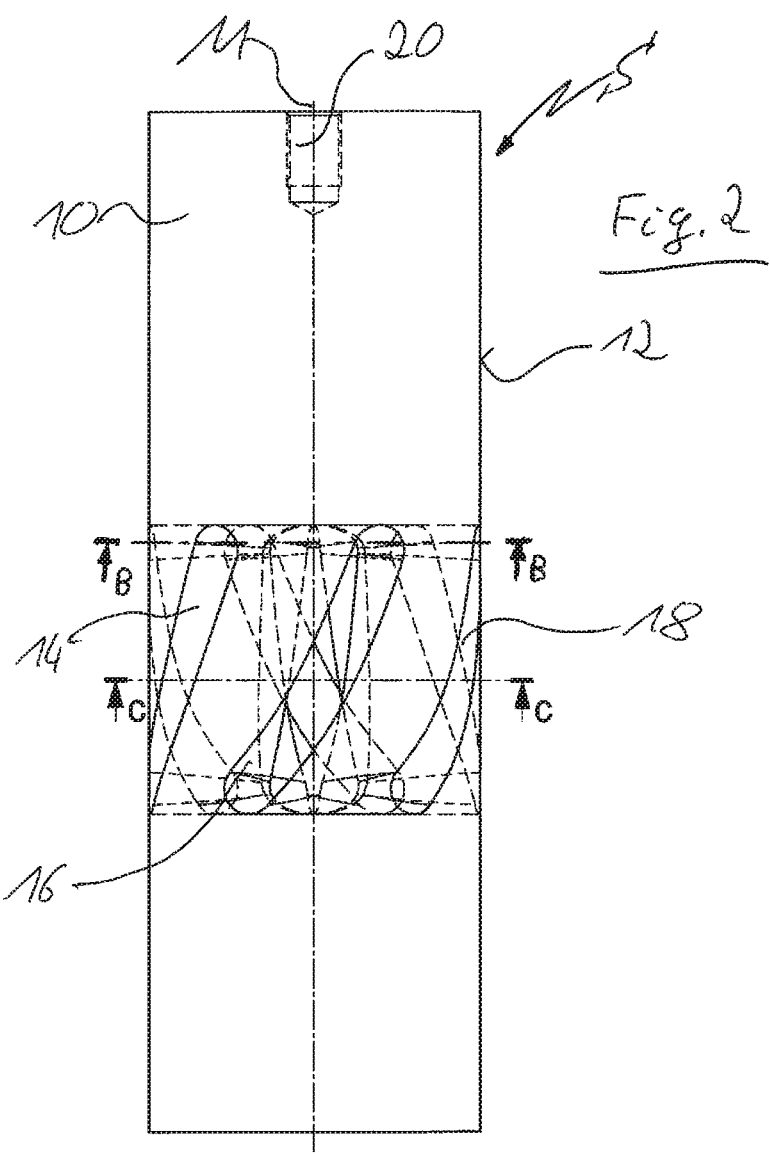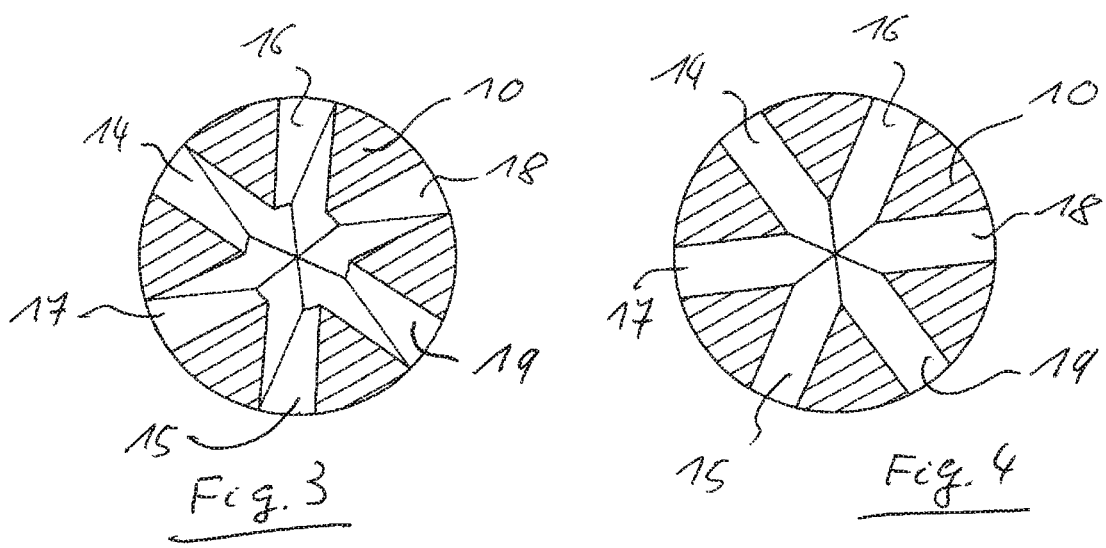

SONOTRODE

CROSS-REFERENCE TO RELATED APPLICATIONS

Figure 1:
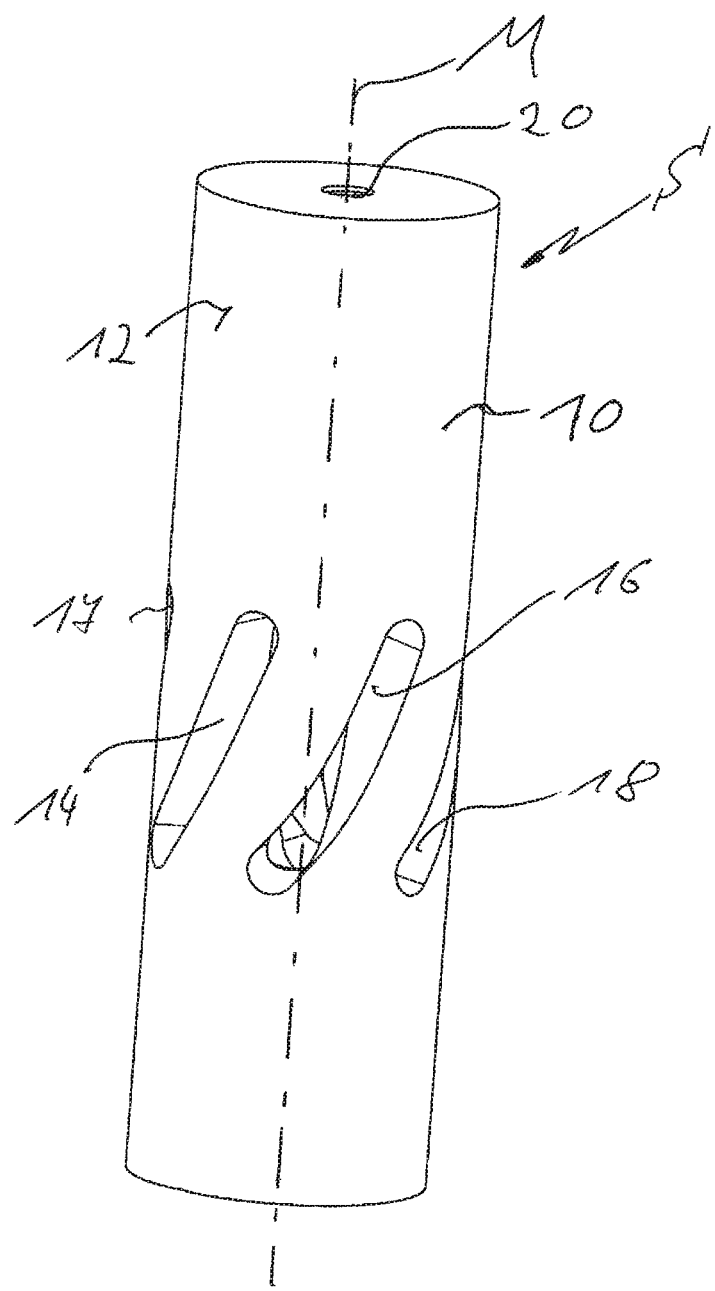

This application claims the benefit and priority of German Patent Application Serial No. 102018129912.5 filed Nov. 27, 2018, the entire disclosure of which is incorporated herein by reference.

FIELD

The present invention relates to an ultrasonic oscillating unit comprising a cylindrical base body having a center axis and a jacket surface into which a plurality of slits are introduced that extend obliquely to the center axis in a side view of the jacket surface.

BACKGROUND

Such an ultrasonic oscillating unit in the form of a sonotrode is known from DE 44 06 818 C1. In this known sonotrode, the base body is formed as a cup-shaped hollow cylinder and the slits are provided as elongate slits extending linearly in a side view. Such a sonotrode can be used to convert a longitudinal vibration imprinted by a converter into a torsional vibration.

SUMMARY

Starting from this prior art, it is therefore the object of the invention to provide an ultrasonic oscillating unit with which a longitudinal vibration can be more effectively converted into a torsional vibration.

This object is satisfied by the features of claim 1 and in particular in that the slits in the base body extend in a curved manner in a side view of the jacket surface. Such a shape of the slits has the result that the material located between the slits deforms by a very large amount on excitation by ultrasound, whereby the desired torsional vibration can be generated much more effectively and in a much more pronounced manner at the non-excited end of the sonotrode.

Advantageous embodiments of the invention are described in the description, in the drawing, and in the dependent claims.

In accordance with a first advantageous embodiment, it can be advantageous for a particularly effective generation of a torsional vibration for the curvature of the slits along the extent of the center axis be selected as not constant. In other words, a slit is curved by different amounts at different positions along the center axis.

It can, for example, be advantageous here if the curvature at the center of a slit is selected as larger than at the ends of the slit since the rotary vibration behavior of the base body is hereby positively influenced.

In accordance with a further advantageous embodiment, a contiguous hollow space can be formed within a solid cylinder solely by the slits. In other words, the hollow spaces formed by the slits communicate with one another, but represent a single contiguous hollow space within the solid cylinder.

The basic shape of the base body can be selected as at least sectionally of a circular cylindrical. Different contours for the cross-section of the cylinder have, however, also been found to be advantageous. The cross-section of the cylinder can thus also be formed as at least sectionally polygonal, for example in the form of a hexagon an octagon, or a polygon. An at least sectionally parallelepiped form of the base body can also be considered.

In accordance with a further advantageous embodiment, the base body can be a solid cylinder. Very good results were able to be achieved by the provision of the curved slits despite the comparatively large mass to be set into rotational vibrations.

Although the slits could generally also be formed as grooves having a groove bottom, it is advantageous if the slits extend so far in the radial direction of the base body that they are in communication with one another. The slits admittedly then each have a peripheral wall, but no base or bottom.

First trials have shown that good results can be achieved if the slits extend in the axial direction over no more than 50%, in particular over 25 to 35%, in particular over approximately 5 to 25%, in particular over no more than 10%, of the axial length of the base body.

In accordance with a further aspect of the present invention, it relates to an ultrasound welding apparatus having a converter and an ultrasonic oscillating unit of the above-described kind and a welding system comprising a generator and such an ultrasound welding apparatus.

DRAWINGS

The present invention will be described in the following purely by way of example with reference to an advantageous embodiment and to the enclosed drawings. There are shown:

FIG. 1 a perspective view of an ultrasonic oscillating unit in the form of a sonotrode;

FIG. 2 a side view of the sonotrode of FIG. 1;

FIG. 3 a sectional representation along the line C-C of FIG. 2; and

FIG. 4 a sectional view along the line B-B of FIG. 2.

Figure 5:
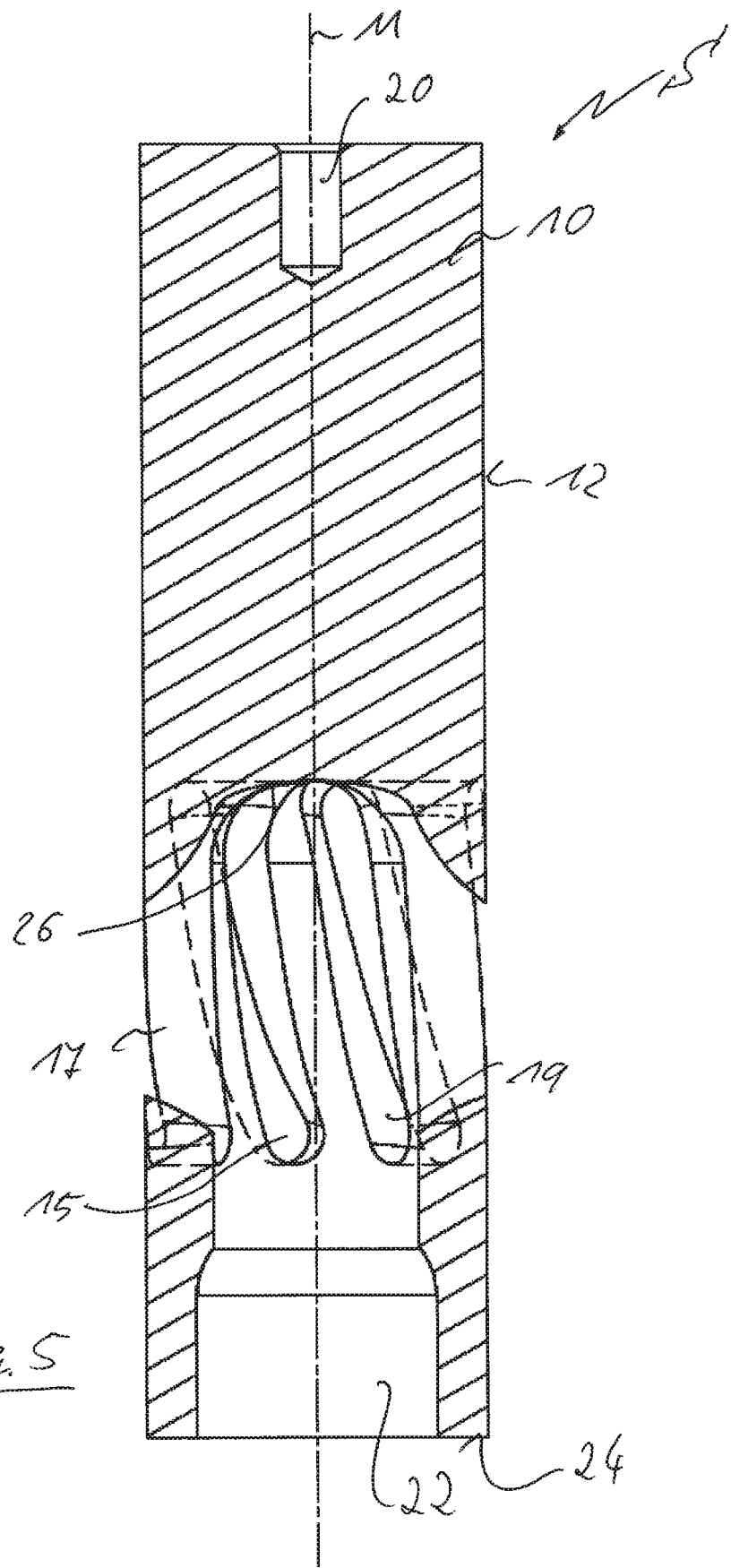
Figure 8:
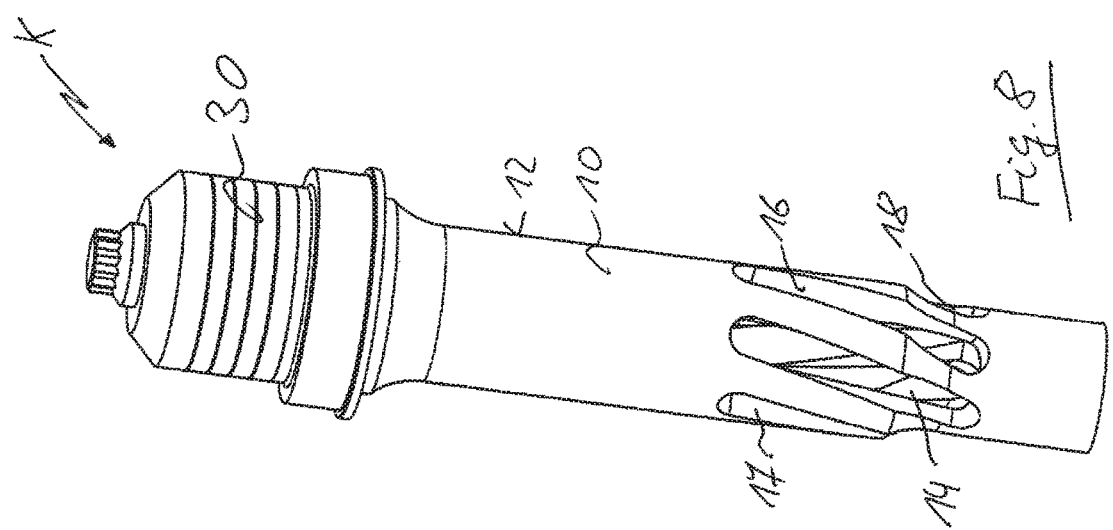
Figure 7:
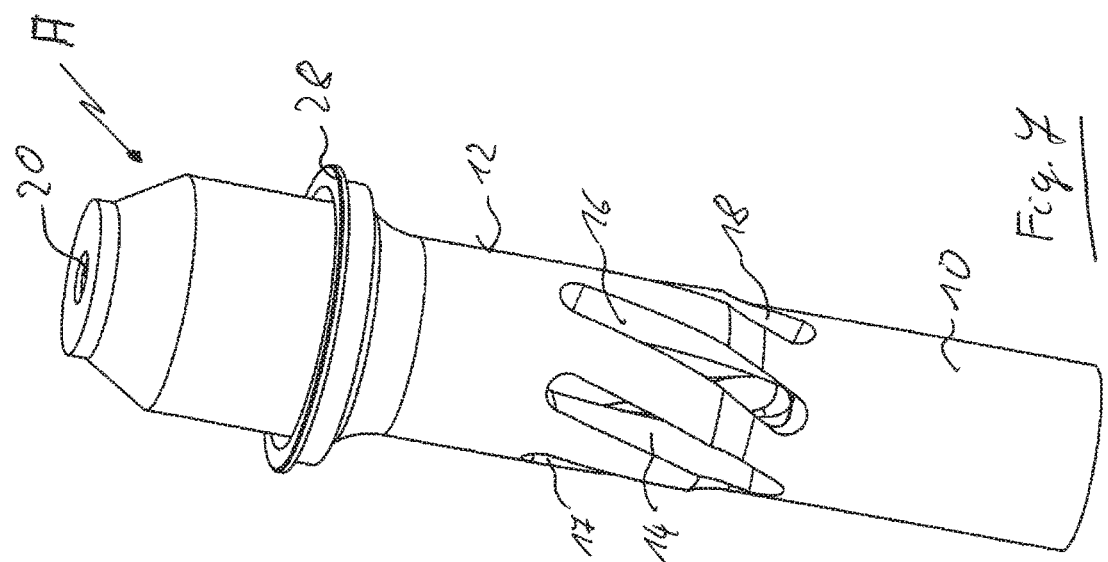
Figure 6:
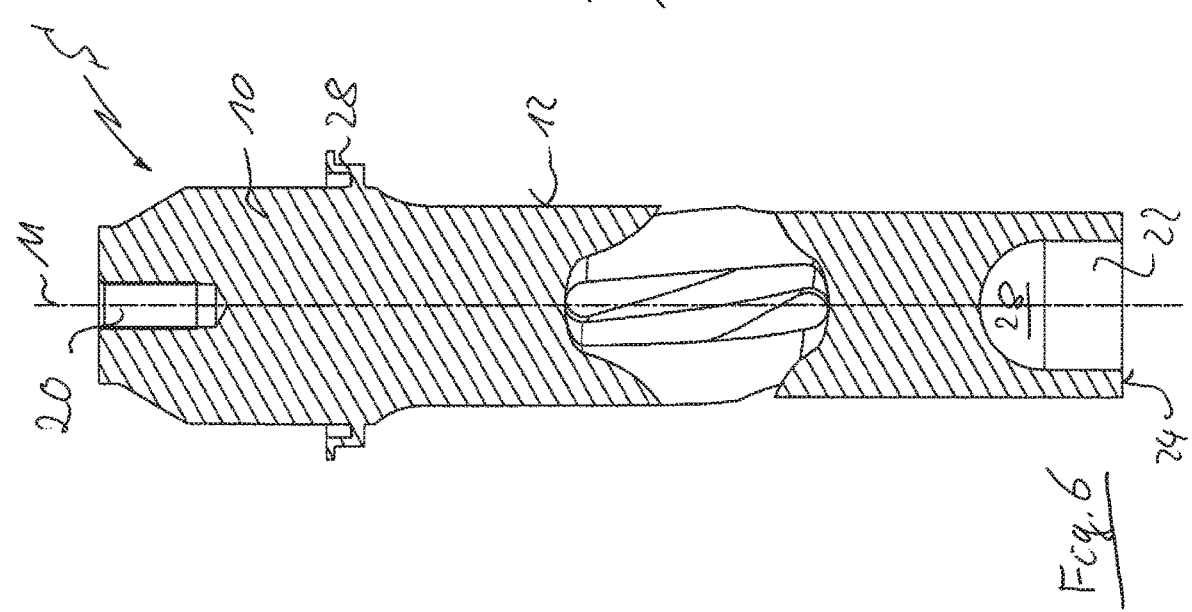

FIG. 5 a sectional view through a further embodiment of a sonotrode;

FIG. 6 a sectional view through a third embodiment of a sonotrode;

FIG. 7 a perspective view of an ultrasonic oscillating unit in the form of an amplitude transformation piece; and FIG. 8 a perspective view of an ultrasonic oscillating unit in the form of a converter.

DETAILED DESCRIPTION

FIG. 1 shows an embodiment of an ultrasonic oscillating unit in the form of a sonotrode S. It has a cylindrical sonotrode body 10 having a center axis M and a jacket surface 12 as a base body, with the axial length of the base body 10 amounting to approximately three times its diameter. In the embodiment shown, a total of six slits 14, 15, 16, 17, 18, and 19 are introduced in the circular cylindrical base body 10 in the region of the jacket surface 12 and extend obliquely to the center axis M in a side view of the jacket surface. A threaded bore 20 is introduced in the region of the upper end face of the base body 10 to connect the base body in a known manner to a converter, to the ultrasound energy coupled into the base body, or to an amplitude transformation piece.

FIG. 2 shows a side view of the sonotrode of FIG. 1, with it being easily recognizable that the slits 14 to 19 do not extend in their longitudinal extent in a straight line, but rather in a curved manner—viewed in the side view of the jacket surface 12. The same applies to a plan view of a development of the jacket surface 12 of the base body 10.

It can furthermore be at least approximately recognized in FIG. 2 that the curvature of each slit is not constant, but varies along the center axis M. The curvature in the embodiment shown is thus larger at the center of a slit than at its ends. The axial extent of the slits of the embodiment shown amounts to approximately 30% of the total axial length of the base body 10.

FIGS. 3 and 4 show respective sections along the line C-C (FIG. 3) and the line B-B (FIG. 4) of FIG. 2. It can be recognized particularly well by these slits that the slits extend so far in the radial direction that they communicate with one another. Although the base body 10 in this embodiment is not formed as a hollow cylinder, but rather as a solid cylinder, that is all the slits within the solid cylinder form a contiguous hollow space.

As FIG. 2 further illustrates, the slits extend in the axial direction, i.e. in the direction of the center axis M over approximately 30% of the total length of the base body 10 and the slits are arranged off center with respect to the length of the base body 10.

In accordance with a further embodiment, an odd number of slits can also be provided, for example five or seven slits.

FIG. 5 shows a further embodiment of a sonotrode S, with the same reference numerals being used for the same parts and sections. The sonotrode S shown in a longitudinal section in FIG. 5 is generally designed in the same manner as the sonotrode of FIG. 1 to FIG. 4. However, a central bore 22 is introduced in the region of the front end face, i.e. of the welding surface of the sonotrode, so that the end-face welding surface 24 is of ring shape. The bore 22 tapers in the further extent and extends up to and into the region of the slits, whereby it is possible to bend the "dome" 26 of the hollow space formed by the slits in the interior of the base body 10 and to form it substantially free of edges.

FIG. 6 shows a third embodiment of a sonotrode S, with the same reference numerals being again used for the same elements and sections. In this embodiment a bore 22 that opens into a semispherical dome 28 is likewise introduced into the front end region of the base body 10. However, the bore 22 does not extend up to and into the region of the slits, but rather in turn forms an annular welding surface 24.

A peripheral fastening flange 28 is molded on in the region of the rear end of the sonotrode. The axial extent of the slits of the embodiment shown amounts to approximately 25% of the total axial length of the base body 10.

FIG. 7 shows a perspective view of an ultrasonic oscillating unit in the form of an amplitude transformation piece A that can be attached between a converter (FIG. 8) and a sonotrode. Such an amplitude transformation piece can also be used due to the slits 14 to 19 to convert longitudinal vibrations into torsional vibrations. A fastening flange 28 can here also be provided at the base body 10. A threaded bore 20 for connection to a converter is provided at the rear end of the base body 10. At least one threaded bore (not shown) or another suitable connection means for connection to a sonotrode is equally located at the front end of the base body 10.

As FIG. 7 further illustrates, the slits there extend over a region in which the outer diameter of the base body 10 varies, namely from a smaller outer diameter in the region of the lower end in FIG. 7 toward a larger outer diameter in the region of the upper end in FIG. 7.

FIG. 8 shows a perspective view of a further embodiment of an ultrasonic oscillating unit, and indeed in the form of a converter K, with the same reference numerals again being used for the same elements. In this respect, piezo elements 30 are provided in a known manner at the rear end of the base body 10 of the converter K and longitudinal ultrasound vibrations are produced by them that are then converted into torsional vibrations due to the provided slits in the region of the converter K. The axial extent of the slits of the embodiment shown amounts to approximately 25% of the total axial length of the base body 10. At least one threaded bore or another suitable connection means can also be provided at the front end of the base body 10 here, e.g. to establish a shape matched connection.

As FIG. 7 and FIG. 8 show, both the amplitude transformation piece A and the converter K can have a reduced diameter in the region of their lower ends.

An ultrasound welding apparatus can be produced using the sonotrodes S in accordance with the invention in that a converter is attached to the upper end of the sonotrode body 10 via the thread 20 and generates ultrasound vibrations in a known manner and couples them into the sonotrode. In the same manner, the amplitude transformation piece A in accordance with the invention or the converter K in accordance with the invention having slits can be assembled to form a welding apparatus by connection to a sonotrode.

A welding system can be produced using such an ultrasound welding apparatus that consists of the aforesaid ultrasound welding apparatus and a generator to excite the converter. When such a welding system in put into operation, the section of the base body located above the slits is set into longitudinal vibration that in turn deforms the webs located between the slits such that the lower region of the base body 10 is set into a torsional vibration about the axis M, which is of advantage for the most varied welding applications.

What is claimed is:

1. An ultrasonic oscillating unit comprising:
   a cylindrical base body having a center axis and a jacket surface into which a plurality of slits are introduced that extend obliquely to the center axis in a side view of the jacket surface,
   wherein the slits extend in a curved manner in the side view of the jacket surface, and wherein a curvature at a center of each of the slits is larger than at ends of the slit.

2. The ultrasonic oscillating unit in accordance with claim 1,
   wherein the base body is a solid cylinder.

3. The ultrasonic oscillating unit in accordance with claim 2,
   wherein a contiguous hollow space is formed within the solid cylinder solely by the slits.

4. The ultrasonic oscillating unit in accordance with claim 1,
   wherein the slits extend so far in the radial direction of the base body that they are in communication with one another.

5. The ultrasonic oscillating unit in accordance with claim 1,
   wherein the ultrasonic oscillating unit has a reduced diameter at at least one of its upper and lower ends.

6. The ultrasonic oscillating unit in accordance with claim 1,
   wherein the slits extend in the axial direction over no more than 50% of an axial length of the base body.

7. The ultrasonic oscillating unit in accordance with claim 6,
   wherein the slits extend in the axial direction over no more than 25 to 35% of the axial length of the base body.

8. The ultrasonic oscillating unit in accordance with claim 6,
wherein the slits extend in the axial direction over approximately 5 to 25% of the axial length of the base body.

9. The ultrasonic oscillating unit in accordance with claim 6,
wherein the slits extend in the axial direction over no more than 10% of the axial length of the base body.

10. The ultrasonic oscillating unit in accordance with claim 1,
wherein the slits includes an odd number of slits.

11. The ultrasonic oscillating unit in accordance with claim 1,
wherein the base body defines a blind bore that extends axially into a region of the slits.

12. The ultrasonic oscillating unit in accordance with claim 1,
wherein the ultrasonic oscillating unit is one of a sonotrode, an amplitude transformation piece, and a converter.

13. An ultrasound welding apparatus comprising an ultrasonic oscillating unit, the ultrasonic oscillating unit comprising a cylindrical base body having a center axis and a jacket surface into which a plurality of slits are introduced that extend obliquely to the center axis in a side view of the jacket surface, wherein the slits extend in a curved manner in the side view of the jacket surface, and wherein a curvature at a center of each of the slits is larger than at ends of the slit.

14. A welding system comprising a generator and an ultrasound welding apparatus, ultrasound welding apparatus comprising an ultrasonic oscillating unit, the ultrasonic oscillating unit comprising a cylindrical base body having a center axis and a jacket surface into which a plurality of slits are introduced that extend obliquely to the center axis in a side view of the jacket surface, wherein the slits extend in a curved manner in the side view of the jacket surface, and wherein the curvature at a center of each of the slits is larger than at ends of the slit.

* * * * *